Patented Sept. 10, 1929.

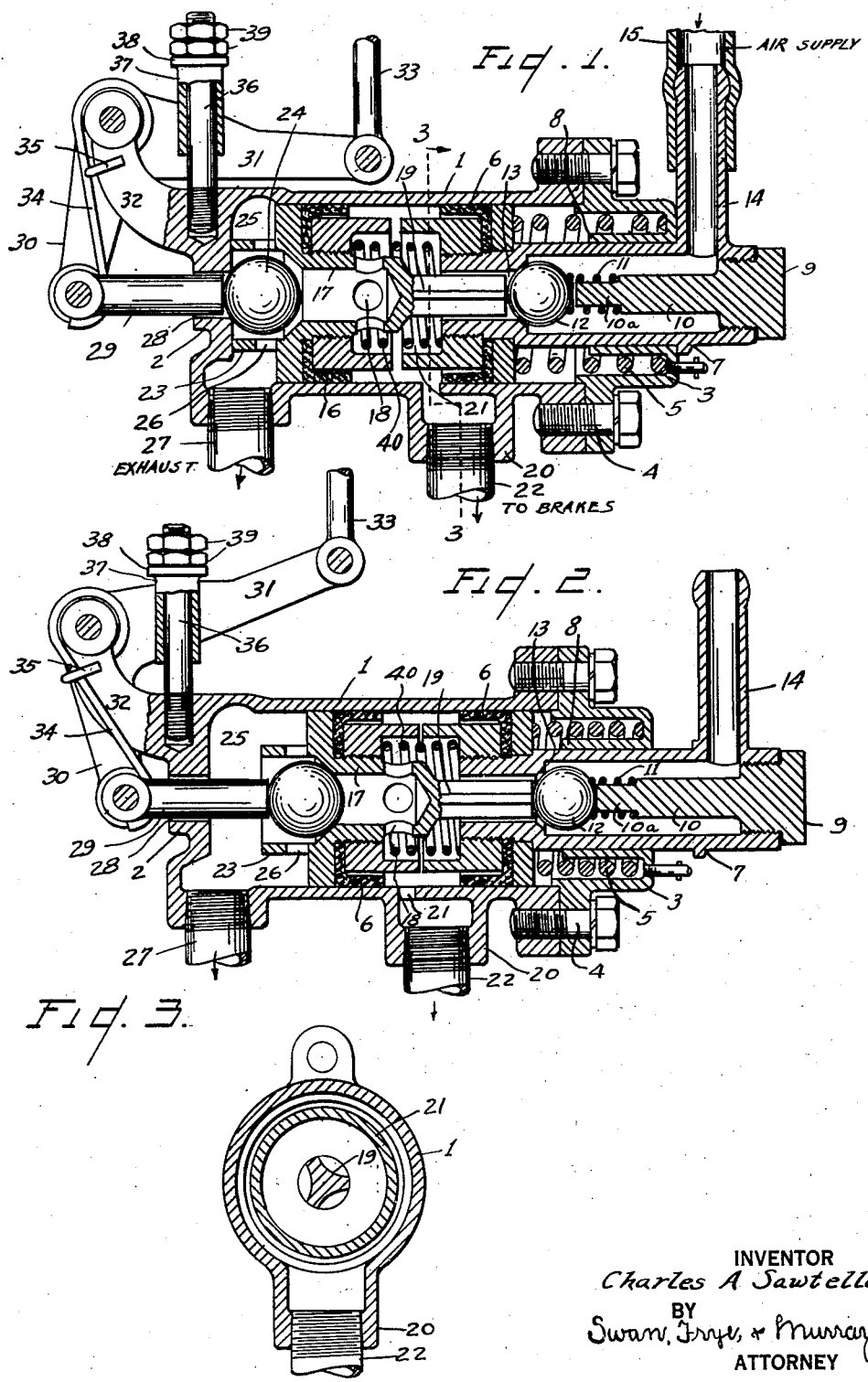

1,727,943

UNITED STATES PATENT OFFICE.

CHARLES A. SAWTELLE, OF DETROIT, MICHIGAN, ASSIGNOR TO INTERNATIONAL AIR BRAKE COMPANY, OF DETROIT, MICHIGAN, A CORPORATION OF UTAH.

CONTROL VALVE FOR FLUID BRAKES.

Application filed August 15, 1927. Serial No. 212,958.

This invention relates to fluid controlled valves, and particularly to valves for the control of fluid braking systems.

An object of the invention is to provide a control valve for a fluid braking system that will effect a reaction of the applied braking pressure against the actuating element of the valve so that the operator may learn to gauge the degree of applied pressure by the stress of such reaction.

Another object is to provide an improved mechanism for first cutting off the brake line of a fluid braking system from its normal communication with the atmosphere and for then establishing said brake line in communication with a source of fluid under pressure.

Still another object is to provide a control valve adapted to automatically cut off communication of a fluid braking line with a source of fluid pressure when the pressure in said line has been built up to a predetermined degree.

These and various other objects the invention attains by the construction hereinafter described and illustrated in the accompanying drawings, wherein:

Figure 1 is an axial sectional view of the improved valve showing the positions of the parts thereof under non-braking conditions.

Figure 2 is a similar view showing the positions of the parts under braking conditions, and Figure 3 is a cross sectional view taken upon the line 3—3 of Figure 1.

In these views the reference character 1 designates a substantially cylindrical valve casing integrally closed at one end as indicated at 2 and provided at its other end with a head 3 detachably secured to the main body of said casing by bolts 4 or the like.

The head 3 is of an approximately dome shape and interiorly receives an end portion of a coiled spring 5 compressed between said head and a piston 6 reciprocatory in said casing. To said piston is rigidly secured in any suitable manner a tubular stem 7 which slides through a bearing 8 formed integrally with the head 3 and which is closed at its outer end by a screw plug 9. A pin 10 projects from said plug into the opening of the stem 7 and has a reduced free end portion 10ª which is embraced by an end portion of a coiled spring 11 normally seating a ball valve 12 to close a port 13 opening through said piston. Exteriorly of the casing 1, 2, 3 the stem 7 is formed with a laterally extending tubular fitting 14 opening into said stem and engageable by a suitable flexible conduit 15 leading to a compressed air tank or other source of fluid under pressure (not shown).

Between the piston 6 and the end 2 of the casing there is arranged a second piston 16 reciprocatory independently of the piston 6 and provided with a hollow hub 17 opening toward the head 2 and ported as indicated at 18 to communicate with the casing between the two pistons. From said hub there projects axially of the casing a fluted pin 19 which enters the port 13 and is adapted to engage and then lift the ball valve 12 when the piston 16 is sufficiently motivated toward the piston 6. A boss 20 exteriorly formed upon the mid-portion of the casing 1 is ported as indicated at 21 to establish communication between the space between the two pistons and a pipe 22 leading to fluid responsive brakes (not shown).

At its end adjacent to the head 2 the piston 16 is formed with an integral collar 23 within which a ball valve member 24 is adapted to seat upon the open end of the hub 17 of said piston to control communication through the ports 18 between the space intermediate the two pistons and the chamber 25 formed between the head 2 and the piston 16. Ports 26 in the collar 23 connect the chamber 25 with an exhaust opening 27 to the atmosphere formed in the wall of the casing 1.

The head 2 is formed with a central opening 28 through which is slidable a stem 29 pivoted upon one arm 30 of a bell crank lever 30, 31 said lever being pivoted upon a bracket 32 carried by the head 2. To the arm 31 of said bell crank is pivotally connected an actuating rod 33 leading to any suitable control point. A wire spring 34 has one end hooked as indicated at 35 to engage the bracket arm 32 and its other end bearing upon the outer end of the stem 29 to normally maintain said stem retracted from engagement with the ball 24.

A bolt 36 tapped into the head 2 carries a sleeve 37 flanged as indicated at 38 to form a stop engageable by the bell crank arm 31 to limit the actuated travel of said bell crank, said sleeve being held adjusted upon said sleeve by lock nuts 39.

A coiled spring 40, considerably lighter than the spring 5 may be compressed between the pistons 6 and 16 to assure their return to a normal slightly spaced relation after an application of the brakes.

In the use of the described valve de-energization of the brakes (not shown) is normally assured by the communication of the pipe 22 with the atmosphere through the port 21, chamber 25, ports 18 and 26 and opening 27. When the pull rod 33 is actuated the bell crank 30, 31 are rocked toward the position shown in Figure 2, the stem 29 initially forcing the ball valve 24 to its seat and thus cutting off the pipe 22 from the atmosphere. As the stem 29 is further advanced into the casing 1 responsive to pressure upon the pull rod 33, the movement of said stem and valve 24 acts to advance the piston 16 toward the piston 6 whereby the pin 19 engages and unseats the ball valve member 12. Air or some other fluid under pressure is then permitted to pass from the air supply pipe 15 through the stem 7 and port 13 into the chamber between the pistons and thence to the brake supply pipe 22 to apply the brakes. The pressure by which the brakes are applied is proportioned to the degree of advance of the stem 29 since this regulates the extent of unseating of the valve member 12.

The fluid pressure which is built up in the brake pipe 22 also prevails in the space between the pistons 6 and 16 so that the degree of such pressure is indicated to the operator by the stress reacting from the piston 16 through the ball 24, pin 29 and bell crank 30, 31 to the rod 33. When said built up pressure between the pistons assumes a certain maximum value the spring 5 will be overcome and will yield sufficiently to allow the piston 6 to move under such pressure to reseat the inner end of the stem 7 upon the ball valve member 12 thus cutting off the brake pipe and chamber between the pistons from the fluid pressure supply.

Thus it is evident that the described valve provides for first cutting off a brake pipe from the atmosphere and then connecting said brake pipe with a source of fluid pressure and that the control member of said valve is placed under such a stress by the so built up pressure as to indicate to the operator the degree of pressure which is being applied. Also said valve is effective to automatically cut off the brake pipe from communication with the source of supply when the braking pressure reaches a certain maximum value.

While it will be apparent that the illustrated embodiments of my invention herein disclosed are well calculated to adequately fulfil the objects and advantages primarily stated, it is to be understood that the invention is susceptible to variation, modification and change within the spirit and scope of the subjoined claims.

What I claim is:

1. A control valve for fluid braking systems comprising a cylindrical casing, a piston reciprocatory in said casing, a tubular stem connected to said piston and sliding through one end of the casing, means connecting said stem to a source of fluid supply, a valve seating in said stem and controlling a passage through said piston, a spring urging said valve to its seat, a control element extending through the opposite end of said casing, and means operable by said element within the casing for unseating said valve.

2. A control valve for fluid braking systems comprising a cylindrical casing having longitudinally spaced ports, one open to the atmosphere and the other for connection to a brake pipe, of a piston reciprocatory in said cylinder between said ports and an end of the cylinder, said piston having a port therethrough, a tubular stem connected to said piston and sliding through said end of the cylinder and adapted exteriorly of the cylinder for connection with a source of compressed fluid supply, a valve controlling the passage through said stem, a pin arranged axially of said cylinder for unseating said valve, a second valve controlling communication between the two said ports, and a common means for controlling said second valve and said pin.

3. A control valve for fluid braking systems comprising a casing having an exhaust opening and an aperture for conducting fluid under pressure to the brakes, a pair of pistons reciprocatory therein, each piston having a tubular central stem provided with a valve seat, a ball valve arranged to seat on each piston, means for normally seating one of said ball valves to prevent the passage of fluid under pressure to the brakes, a connection between said piston and a source of fluid supply rearwardly of said ball valve, a member carried by the other piston in position to engage with said ball valve and unseat it to permit passage of fluid under pressure to the brakes, means for moving the second piston to unseat said valve when desired, including means for seating the second ball valve upon the second piston to prevent passage of fluid under pressure to the exhaust aperture of the casing, and means for moving the first mentioned piston to automatically reseat the first mentioned ball valve when the pressure upon the brakes has reached a predetermined maximum.

4. A control valve for fluid braking systems comprising a cylindrical casing having an exhaust opening therein adjacent one extremity and a port for connection with a brake pipe adjacent its center, a piston reciprocable within the casing between said port and the other end of the cylinder and having a hollow stem carrying a valve seat, means for connecting the hollow stem with a source of fluid under pressure, a ball valve arranged in the hollow stem and normally spring pressed upon said seat, a second piston reciprocable in the casing between the exhaust opening and said port and having a hollow stem carrying a valve seat, a normally open ball valve arranged to cooperate with the valve seat of the second piston, a fluted member projecting from the second piston into the hollow stem of the first piston for unseating the ball valve of the first piston whenever desired, and means for first closing the valve of the second piston and then moving the second piston to unseat the valve of the first piston to permit passage of fluid pressure to the brake pipe.

5. A control valve for fluid braking systems comprising a cylindrical casing having an exhaust opening therein adjacent one extremity, and a port for connection with a brake pipe adjacent its center, a piston reciprocable within the casing between said port and the other end of the cylinder and having a hollow stem carrying a valve seat, means for connecting the hollow stem with a source of fluid under pressure, a ball valve arranged in the hollow stem and normally spring pressed upon said seat, a second piston reciprocable in the casing between the exhaust opening and said port and having a hollow stem carrying a valve seat, a normally open ball valve arranged to cooperate with the valve seat of the second piston, a fluted member projecting from the second piston into the hollow stem of the first piston for unseating the ball valve of the first piston whenever desired, and means for first closing the valve of the second piston and then moving the second piston to unseat the valve of the first piston to permit passage of fluid under pressure to the brake pipe, and means for permitting reciprocatory movement of the first mentioned piston when the fluid pressure upon the brakes has reached a predetermined maximum to automatically reseat its valve seat upon its ball valve.

6. A control valve for fluid braking systems, comprising a casing, a pair of pistons reciprocating in said casing, to and from each other, jointly forming a fluid pressure chamber, and respectively formed with an inlet to and an outlet from said chamber, the wall of said casing being formed with an opening into said chamber for connection with a brake line, means for delivering a fluid under pressure to said inlet, means for opposing a predetermined resistance to travel of said inlet-forming piston from the other piston, a valve member normally closing said inlet, movable from the inlet-forming piston to an open position and adapted to be closed by a travel of the inlet-forming piston from the other piston, a valve member controlling said outlet, and means for controlling said valve members in common, acting upon the inlet-controlling valve member through the outlet forming piston.

7. A control valve for fluid braking systems, comprising a casing, a pair of pistons reciprocating in said casing, to and from each other, jointly forming a fluid pressure chamber, and respectively formed with an inlet to and an outlet from said chamber, the wall of said casing being formed with an opening into said chamber for connection with a brake line, means for delivering a fluid under pressure to said inlet, a spring in said casing opposing a predetermined resistance to travel of said inlet-forming piston from the other piston, a valve member normally closing said inlet, movable from the inlet-forming piston to an open position and adapted to be closed by a travel of the inlet-forming piston from the other piston, a valve member controlling said outlet, and means for controlling said valve members in common, acting upon the inlet controlling valve member through the outlet-forming piston.

8. A control valve for fluid braking systems, comprising a casing, a pair of pistons reciprocating in said casing, to and from each other, jointly forming a fluid pressure chamber, and respectively formed with an inlet to and an outlet from said chamber, the wall of said casing being formed with an opening into said chamber for connection with a brake line, means for delivering a fluid under pressure to said inlet, means for opposing a predetermined resistance to travel of the inlet-forming piston from the other piston, a valve member normally closing said inlet, movable from the inlet-forming piston to an open position and adapted to be closed by a travel of the inlet-forming piston from the other piston, a valve member controlling said outlet, a stem carried by the outlet-forming piston projecting toward said inlet valve and adapted to unseat said inlet valve through travel of the outlet-forming piston toward the other piston, a valve controlling said outlet, normally unseated, and a common means for seating said outlet valve and actuating said outlet-forming piston toward the other piston to unseat said inlet valve by said stem.

9. A control valve for fluid braking systems, comprising a casing, a pair of pistons reciprocatory in said casing to and from each other, jointly forming a fluid pressure chamber, and respectively formed with an inlet to and an outlet from said chamber, the wall of said casing being formed with an opening into said chamber for connections with a brake line, means for delivering a fluid under pressure to said inlet, a pair of valve members seating toward each other to respectively control said inlet and outlet, means for initially seating the outlet-controlling valve member for then actuating the outlet-forming piston toward the other piston, means for unseating the inlet-controlling valve member responsive to travel of the outlet-forming piston toward the other piston, the inlet-controlling valve member being again engageable with its seat through actuation of the inlet-forming piston from the other piston, and means opposing a predetermined resistance to travel of the inlet-forming piston from the other piston.

10. A control valve for fluid braking systems, comprising a casing, a pair of pistons reciprocatory in said casing, to and from each other jointly forming a fluid pressure chamber, and respectively formed with an inlet to and an outlet from said chamber, the wall of said casing being formed with an opening into said chamber for connection with a brake line, a tubular stem in communication with said inlet and slidable in unison with said inlet-forming piston through an end wall of said casing, means for delivering a fluid under pressure to said stem exteriorly of the casing, means for opposing a predetermined resistance to travel of said inlet-forming piston from the other piston, a valve member normally closing said inlet, movable from the inlet-forming piston to an open position and adapted to be closed by a travel of the inlet forming piston from the other piston, a valve member controlling said outlet, and means for controlling said valve members in common, acting upon the inlet-controlling valve member through the outlet-forming piston.

11. A control valve for fluid braking systems, comprising a fluid pressure chamber having opposite walls movable to and from each other to expand and contract said chamber, and respectively formed with an inlet to and an outlet from said chamber, means for connecting said chamber with a brake line, means for delivering a fluid under pressure to said inlet, a pair of valve members seating toward each other to respectively control said inlet and outlet, means for initially seating the outlet-controlling valve member and for then actuating the outlet-forming wall toward the opposed wall of the pressure chamber, means for unseating the inlet-controlling valve member responsive to travel of the outlet-forming wall toward the opposed wall, the inlet-controlling valve member being again engageable with its seat through travel of the inlet-forming wall from the other wall, and means opposing a predetermined resistance to travel of the inlet-forming wall from the other wall.

12. A control valve for fluid braking systems, comprising a fluid pressure chamber having opposite walls movable to and from each other to expand and contract said chamber, and respectively formed with an inlet to and an outlet from said chamber, means for connecting said chamber with a brake line, a tubular stem in communication with said inlet and secured to said outlet-forming wall and slidable through said inlet-forming wall, means for delivering a fluid under pressure to said stem exteriorly of said chamber, a pair of valve members seating toward each other to respectively control said inlet and outlet, means for initially seating the outlet-controlling valve member and for then actuating the outlet-forming wall toward the opposed wall of the pressure chamber, means for unseating the inlet-controlling valve member responsive to travel of the outlet-forming wall toward the opposed wall, the inlet-controlling valve member being again engageable with its seat through travel of the inlet-forming wall from the other wall, and means opposing a predetermined resistance to travel of the inlet forming wall from the other wall.

13. A control valve for fluid braking systems, comprising a casing, a pair of pistons reciprocatory in said chamber to and from each other, herein termed the first and second pistons, jointly forming a fluid pressure chamber, means for delivering a fluid under pressure to said chamber, means establishing a brake line connection to said chamber, means for venting fluid from said chamber, a valve member controlling the fluid delivery to said chamber, a normally unseated valve member controlling the fluid exhaust from said chamber, a common means for manually seating the exhaust-controlling valve member and for actuating the first piston toward the second piston, means for unseating the fluid delivery controlling valve member responsive to such actuation of the first piston, the second piston being adapted by its travel from the first piston to seat said delivery controlling valve member, and means opposing a predetermined resistance to travel of the second piston from the first one.

14. A control valve for fluid braking systems comprising a casing, means for delivering a fluid under pressure to said casing, means establishing a brake line connection to said casing chamber, means for venting fluid from said casing, a valve member controlling the fluid delivery to said casing, means for manually unseating said valve member, means opposing the pressure of fluid in said chamber to unseating of said valve member, and means for automatically reseating said valve member responsive to a predetermined fluid pressure in said casing.

In testimony whereof I hereunto set my hand.

CHARLES A. SAWTELLE.